C. J. WILSON.
Saw.
No. 196,850.  Patented Nov. 6, 1877.
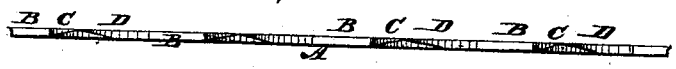
WITNESSES:  INVENTOR:

UNITED STATES PATENT OFFICE.

CHRISTOPHER J. WILSON, OF MACON, GEORGIA.

IMPROVEMENT IN SAWS.

Specification forming part of Letters Patent No. 196,850, dated November 6, 1877; application filed September 22, 1877.

*To all whom it may concern:*

Be it known that I, CHRISTOPHER JENKINS WILSON, of Macon, county of Bibb, and State of Georgia, have invented a new and Improved Saw, of which the following is a specification:

Figure 1 is a side view of a section of a circular saw to which my improvement has been applied. Fig. 2 is an edge view of the same.

Similar letters of reference indicate corresponding parts.

The object of this invention is to improve the construction of the improvement for which Letters Patent No. 193,740 were granted to me July 31, 1877, so as to better adapt it for circular saws, causing them to run easier and cut faster and smoother than ordinary circular saws.

The invention will first be described in connection with the drawing, and then pointed out in the claim.

In the drawing, A represents the plate of the saw, the teeth of which are arranged in sets of three to a set. B is the clearing-tooth, which is made straight, a little lower than the cutting-teeth C D, projects forward so as to have both edges inclined, and has a cavity formed in front of its base, giving the cutting-teeth C D the appearance of being formed upon the rear edge of the clearing-teeth B.

The teeth C are beveled upon the right-hand side, and the teeth D upon the left-hand side from the base to the points, and the points of the said teeth C D are rounded off and sharpened, as shown in Fig. 1.

Having thus fully described my invention, I claim as new and desire to secure by Letters Patent—

A saw provided with three teeth in each set, the front one being a base recessed clearer in line with the saw-plate, and the other two being cutters vertical on one edge, inclined on the other, and sharpened as well as rounded on the points, as shown and described.

C. J. WILSON.

Witnesses:
    JAS. GREENE,
    J. D. CUMMING.